Dec. 14, 1954  D. K. DEAN  2,696,775
COOKING AND REFRIGERATING APPARATUS
Filed Aug. 23, 1950
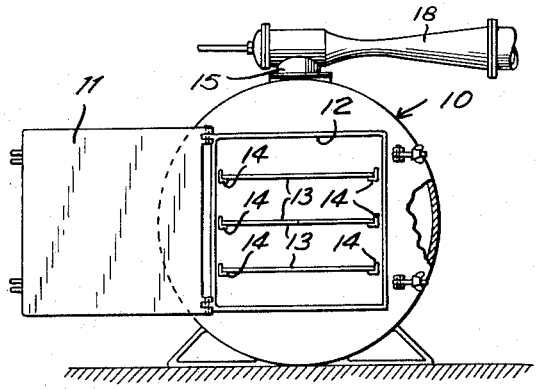
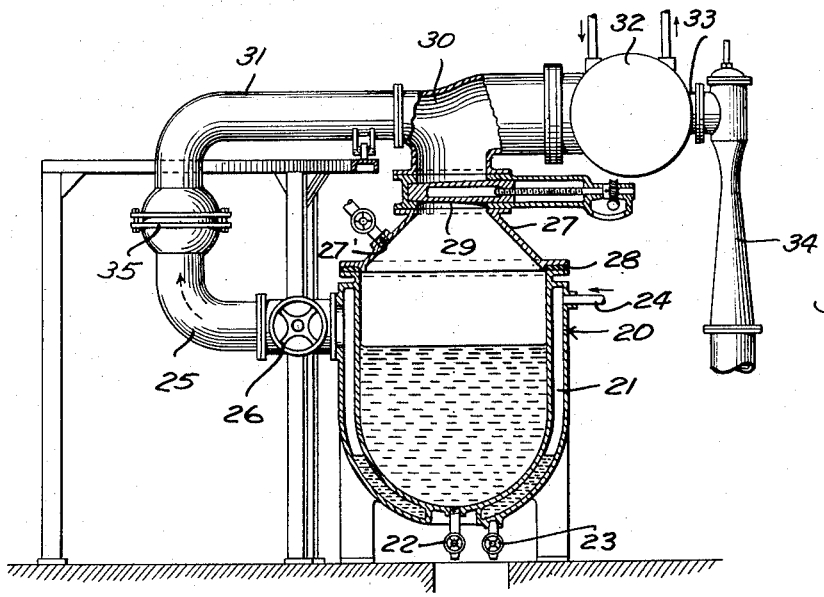
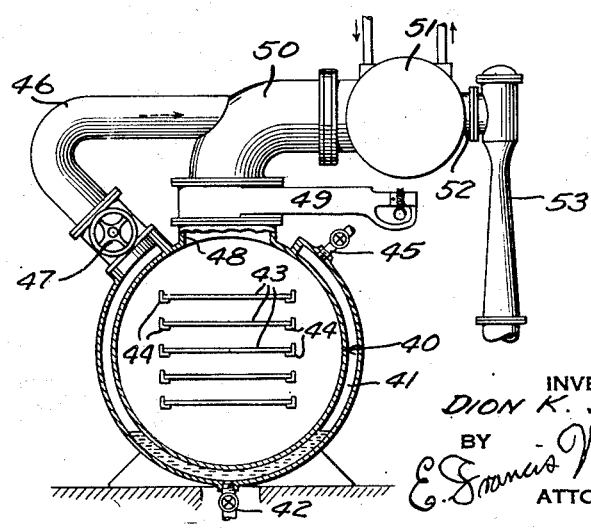
INVENTOR
DION K. DEAN
BY
E. Francis Wentworth Jr.
ATTORNEY

2,696,775

Patented Dec. 14, 1954

2,696,775

COOKING AND REFRIGERATING APPARATUS

Dion K. Dean, Rahway, N. J., assignor to Foster Wheeler Corporation, New York, N. Y., a corporation of New York Application August 23, 1950, Serial No. 181,070

4 Claims. (Cl. 99—246)

This invention relates to cooking and refrigerating systems and is particularly applicable to the treatment of both liquid or solid foodstuffs or other liquid or solid products containing some free moisture, or volatile constituent.

An object and feature of the invention is the treatment of moisture or volatile constituent containing liquid or solid foods or other materials to evacuation in confined spaces for the purposes of dehydration, chilling and freezing thereof in short periods of time.

Another object and feature of the invention is the combination of cooking or baking of such foods or materials with subsequent evacuation treatment in the same confining spaces for similar purposes, thereby eliminating material or food handling steps and dangers of bacterial or other contamination.

Another object and feature of the invention is the treatment of such foods or materials to evacuation or vacuum type refrigeration for the purposes of reducing chilling time in the critical temperature ranges wherein bacteria multiply to such a short period that bacterial action becomes ineffective.

Other objects and features of the invention are the provision of novel apparatus for practicing the invention.

Other objects and novel features of the invention will become apparent from the following specification and the accompanying drawings wherein:

Fig. 1 is a partially diagrammatic, partially-sectionalized elevational view of one form of apparatus with which the invention may be practiced particularly in the treatment of solid materials;

Fig. 2 is a partially-diagrammatic sectional elevation of another form of apparatus including a cooking arrangement for liquids in conjunction with a vacuum refrigerating system for practicing the invention; and Fig. 3 is a similar partially-diagrammatic sectional elevation of an oven in conjunction with a vacuum refrigerating system for practicing the invention particularly in the treatment of solids.

In Fig. 1, 10 denotes a vacuum tank or receptacle provided with a door 11 that may be closed in sealing relationship at the tank opening 12. A plurality of trays 13 designed to hold solid foodstuffs or other solids containing some free moisture or volatile constituent or content are supported in superposed relationship within the tank 10, being spaced apart and guided by the rails 14. The outlet 15 of the tank is connected to exhausting apparatus such as a vacuum pump 18.

The foodstuffs or other solids containing some free moisture are placed on the trays 13 which are then inserted into the tank 10. The door 11 is then closed in sealing relationship at the opening 12 and the vacuum pump 18 is set in operation to produce a high vacuum in tank 10. The evaporation of moisture on the surface of and within the interstices of the product and resultant removal of heat from the product equivalent to that represented by the latent heat of evaporation of the moisture evaporated results in a quick cooling of the product to any desired degree above the freezing point and also, if desired to below the freezing point with consequent freezing of the product.

Experiments on a number of products such as solid pieces of beef, diced beef, mushrooms, solid pieces of chicken, diced chicken, sweet potatoes, etc. have shown that it is possible to cool products from an entering or initial temperature as high as the boiling point of water (212° F.) down to the freezing point and to freeze these products within a time varying from five (5) to ten (10) minutes by the evacuation resulting from operation of the vacuum pump 18.

The use of vacuum cooling of this type for the solid products combined with further refrigeration by low temperature chilling brings about quick freezing of such products, with a great saving of time and improvement in the keeping qualities of the products, since by the vacuum cooling the food is cooled through the temperature ranges within which bacteria may multiply at a very rapid rate, namely in the matter of a few minutes. If chilling alone by subjecting the products to a cold atmosphere were depended upon, it is probable that it would take a matter of hours for the product to pass through said bacteria multiplying temperature ranges.

In addition to the refrigeration factor, it has been found in certain cases where food products are to be packaged that dehydration is of appreciable value. In the practice of the instant process since moisture is evaporated to some degree from the food product, it follows that dehydration results. The actual moisture lost, of course, varies with the percentage of moisture in the particular food product and the specific heat of its other constituents.

For example, in practicing the process of the invention, sweet potatoes initially at a temperature of 178° F., were cooled and frozen at a temperature of 28° F. in a total of eight (8) minutes. During this period there was a loss of weight of approximately 15% represented by dehydration. Such a loss of weight would probably reduce the volumes of certain products appreciably with resultant saving in packaging and in storage space.

It follows that the simple process of vacuum refrigeration for moisture or volatile constituent-containing products has two desirable results not accomplished in ordinary chilling, namely: the product is chilled and simultaneously dehydrated to a certain degree. Secondly, combined with the quick reduction to the lower temperatures to be attained, the time of freezing will be greatly shortened, and the products will pass through the critical temperature range wherein bacteria multiply within a very short time.

In Fig. 2, the vacuum refrigeration cooler system utilized in Fig. 1 is applied in combination with a cooking arrangement for cooking liquids. A cooking vessel 20 having a steam jacket 21 and having usual drain outlets 22 for the vessel and 23 for the jacket is provided. The jacket 21 has a steam inlet 24 through which steam under pressure may be introduced and an outlet conduit 25 controlled by a valve 26. A cover 27 having a liquid inlet 27' through which liquid to be treated is conducted into vessel 20 is positioned in sealing arrangement through gasket 28 over the open top of the vessel 20 and is provided with a gate valve 29 leading to a conduit 30 physically connected to the cover 27 at the said gate valve. This conduit 30 communicates through a conduit 31 with the steam outlet conduit, and also with a condenser 32. The condenser 32 is connected to a conduit 33 communicating with an exhaust or vacuum pump 34. For convenience, the connection between conduits 25 and 31 is a pivot joint 35 which permits the cover 27 to be swung clear of the open top of the vessel 20 for filling and for removal of its contents.

In practicing the invention with the apparatus of Fig. 2, the liquid foods or other materials are introduced into vessel 20 through inlet 27' in its top. The cover 27 is then closed in sealing relationship over the vessel with gate valve 29 closed and steam under pressure introduced into jacket 21 via conduit 24. After a suitable cooking period, depending upon the nature of the food product or material in vessel 20 resulting from the steam heat, steam is cut-off and the gate valve 29 is opened providing communication between the vessel 20 and vacuum pump 34 to create a vacuum in said vessel. This vacuum will carry off a certain portion of the moisture or volatile content of the cooked food or material in the vessel 20 and chill the remaining product in the vessel by the removal of the latent heat of evaporation of moisture or volatile content carried away. By vacuum reduction of the pressure in the vessel 20 to a sufficiently low absolute value, namely less than 4½ millimeters of mercury abs. it is possible to freeze the remaining product in the vessel. If steam is used as the heating medium in the jacket 21, a small amount of condensate left in the jacket at the end of the cooking stage and the jacket itself may be subjected to the evacuation action of pump 34 by opening the valve 26. The removal of latent heat of evaporation of moisture from the condensate in jacket 21 will then increase the cooling rate of the contents of vessel 20 and speed the chilling of the vessel's contents. It will be understood that the amount of condensate in the jacket may be controlled by either manual or automatic control of valve 26.

While steam is preferably the heating medium to be used in the jacket 21, other heating media are possible and are contemplated. For example, electric strip heating elements may be positioned in the jacket for providing the cooking heat. When cooking is completed, a small amount of water may be introduced into the jacket and the valve 26 then opened to the vacuum pump 34. In such event the cooling of the water in the jacket by evaporation provides the same chilling effect as steam condensate and speeds the rapidity of cooling of the vessel's contents.

The presence of the condenser 32 in the vacuum line contributes to reduction in the required vapor handling capacity of the vacuum pump 34. For example, if the food product is initially at a temperature appreciably higher than that of the normal water supply, it is possible to condense some of the vapors removed from the vessel 20 and its jacket 21 by introducing water at normal supply temperature into the condenser 32 thus reducing appreciably the vapor handling capacity requirements of the vacuum pump 34.

In Fig. 3, the arrangement is similar to that of Fig. 2, except that the cooking vessel is replaced by an oven in which solid, moisture-containing or volatile-constituent-containing food products or other materials may be introduced and baked by the heat from the heating jacket and subsequently vacuum cooled and frozen in a similar way to that practiced in Fig. 2.

Referring specifically to Fig. 3, an oven 40 having a steam jacket 41 and a usual drain outlet 42 for the jacket is provided. The oven 40 has an end opening and a door (not shown) movable into closed sealing arrangement therewith. Trays 43 similar to trays 13 of Fig. 1 are similarly supported in the oven 40 on rails 44. The jacket 41 has a steam inlet 45 through which steam under pressure may be introduced and an outlet conduit 46 controlled by a valve 47. A conduit 48 controlled by a gate valve 49 is connected to a conduit 50 which also communicates with the steam outlet conduit 46 and with a condenser 51. The condenser 51 is connected to a conduit 52 communicating with an exhaust or vacuum pump 53.

In practicing the invention with the apparatus of Fig. 3, the solid, moisture containing food products or volatile constituent-containing materials are placed on the trays 43 and introduced into the oven 40. Its door is then closed in sealing relationship and steam introduced into the jacket 41 via conduit 45. The heat from the steam bakes the food products or materials. After a suitable baking period, depending upon the nature of the food products or materials in the oven steam is cut off, and the gate valve opened to exhaust the oven 40 by action of pump 53. The vacuum thus created will carry off a certain portion of the moisture content in the baked food product or material in the oven and chill it rapidly by removal of latent heat of evaporation of moisture carried away. The extent of vacuum in oven 40 is substantially like that in vessel 20 and it is thereby possible to freeze the food product or material in the oven. Similar vacuum treatment of steam condensate in jacket 41 by opening of valve 47 exhausts the steam jacket and in evaporation of some of the condensate enhances and speeds the cooling of the food product in the oven 40. The condenser 51 serves the same purpose as condenser 32. Similarly, electric strip heating elements may be used in the jacket 41 in place of steam.

If desired, the heating medium introduced into jackets 21 or 41 may be other than steam, for example a eutectic mixture of diphenyl and diphenyl oxide known commercially as "Dowtherm" a product of the Dow Chemical Company of Midland, Michigan.

The combined provision of cooking or baking and quick vacuum chilling or freezing as practiced with the systems of Figs. 2 and 3 provides many advantages. Not only the product treated but the entire contents of the vessel 20 or oven 40 will be heat-sterilized, and since cooling and freezing are effected without removal or introduction of any fresh substance into the vessel or oven, the food products can be completely processed without any danger of bacterial growth or contamination. Food handling is also reduced considerably. In addition, partial dehydration of food products or materials treated, which is also inherent in practice of the system of Fig. 1, reduces volume of these products and is of aid in reducing the quantities of packaging materials and sizes of packages with subsequent storage space savings.

The apparatus and methods described are applicable in the treatment of food or other products having volatile content that will be withdrawn upon the application of vacuum to the vessels 10, 20 or 40 herein in which such products may be treated as described herein.

While specific embodiments of the system and methods have been described and shown, variations are possible within the scope of the claims. There is no intention, therefore, of limitation to the exact detail shown and described.

What is claimed is:

1. Apparatus for treating of material having a volatile content comprising a vessel with a single chamber having an opening therein, a removable cover positioned over said opening, a steam compartment jacketing said chamber, a source of steam, a steam conduit communicating with the steam compartment and with said source, a valve control in said steam conduit, a vacuum pump constructed so as to have a capacity to reduce the pressure to a low absolute value in said chamber and jacket, an exhaust conduit communicating with the vacuum pump and with said single chamber, a valve control in said exhaust conduit, another exhaust conduit communicating with the vacuum pump and said steam compartment, and a valve control in said another exhaust conduit.

2. The apparatus of claim 1 including a condenser interposed in advance of the vacuum pump.

3. The apparatus of claim 1 in which the vessel is constructed and arranged to receive a substantially solid food product in said chamber.

4. The apparatus of claim 1 in which the chamber of said vessel is constructed and arranged to receive a food product in liquid form.

References Cited in the file of this patent

UNITED STATES PATENTS

| Number | Name | Date |
| --- | --- | --- |
| 994,555 | Alexander | June 6, 1911 |
| 1,438,594 | Goldberger | Dec. 12, 1922 |
| 1,884,429 | Warner | Oct. 25, 1932 |
| 2,374,425 | Weerth | Apr. 24, 1945 |
| 2,425,714 | Baer | Aug. 19, 1947 |
| 2,450,645 | Doyle | Oct. 5, 1948 |
| 2,456,124 | Hoffman | Dec. 14, 1948 |

FOREIGN PATENTS

| Number | Country | Date |
| --- | --- | --- |
| 509 | Great Britain | 1856 |
| 601,162 | Great Britain | Apr. 29, 1948 |